(12) United States Patent
Ogawa et al.

(10) Patent No.: US 7,834,108 B2
(45) Date of Patent: Nov. 16, 2010

(54) POWDER TRANSFER DEVICE AND POLYOLEFIN PRODUCTION PROCESS

(75) Inventors: Hiroyuki Ogawa, Ichihara (JP); Hideki Sato, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/332,055

(22) Filed: Dec. 10, 2008

(65) Prior Publication Data

US 2009/0149611 A1 Jun. 11, 2009

(30) Foreign Application Priority Data

Dec. 11, 2007 (JP) ............... 2007-320170

(51) Int. Cl.
*C08F 2/34* (2006.01)
*B01J 8/08* (2006.01)
*B01J 8/18* (2006.01)

(52) U.S. Cl. ............... 526/65; 526/88; 526/920; 422/134; 34/582

(58) Field of Classification Search ........... 526/65, 526/88, 920; 34/582; 422/134
See application file for complete search history.

(56) References Cited

U.S. PATENT DOCUMENTS

| | | | |
|---|---|---|---|
| 2,477,454 A | 7/1949 | Heath | |
| 2,890,106 A | 6/1959 | Heath | |
| 2,936,303 A | 5/1960 | Goins | |
| 3,079,222 A | 2/1963 | Reeve | |
| 3,242,586 A | 3/1966 | Peterson | |
| 3,262,922 A | 7/1966 | Payne | |
| 3,644,583 A | 2/1972 | Scoggin et al. | |
| 3,652,527 A | 3/1972 | Trieschmann et al. | |
| 3,719,029 A | 3/1973 | Suzukawa et al. | |
| 3,957,448 A | 5/1976 | Shepard et al. | |
| 3,971,768 A | 7/1976 | Peters et al. | |
| 4,129,701 A | 12/1978 | Jezl et al. | |
| 4,337,722 A | 7/1982 | Debayeux et al. | |
| 4,404,083 A | 9/1983 | Vasalos | |
| 4,419,330 A * | 12/1983 | Ishihara et al. ............... | 422/143 |
| 4,441,822 A | 4/1984 | Biswas et al. | |

(Continued)

FOREIGN PATENT DOCUMENTS

CA 739660 8/1966

(Continued)

OTHER PUBLICATIONS

Search Report from Singapore Application No. 200809160-5 dated May 26, 2009.

(Continued)

*Primary Examiner*—Fred M Teskin
(74) *Attorney, Agent, or Firm*—Birch, Stewart, Kolasch & Birch, LLP

(57) ABSTRACT

The present invention provides a powder transfer device that has a simple construction, yet enables the powder discharge rate to be easily controlled, as well as a polyolefin powder production process using such a powder transfer device. A powder transfer device includes a downcomer which extends downward, and a gas slider situated below the downcomer. The gas slider has, on a side thereof facing an opening at a bottom end of the downcomer, a gas dispersion plate in which a plurality of gas outlets are formed.

5 Claims, 7 Drawing Sheets

U.S. PATENT DOCUMENTS

| | | | |
|---|---|---|---|
| 4,457,896 | A | 7/1984 | Kono |
| 4,466,082 | A | 8/1984 | Zoschak et al. |
| 4,518,750 | A | 5/1985 | Govoni et al. |
| 4,533,367 | A | 8/1985 | Hadzismajlovic |
| 4,640,339 | A | 2/1987 | Klaren |
| 4,744,413 | A | 5/1988 | Klaren et al. |
| 5,213,768 | A | 5/1993 | Maurel et al. |
| 5,235,009 | A | 8/1993 | Hogan |
| 5,674,308 | A | 10/1997 | Meissner et al. |
| 5,676,201 | A | 10/1997 | Klaren |
| 6,066,701 | A | 5/2000 | Koveal et al. |
| 6,306,981 | B1 | 10/2001 | Brown et al. |
| 6,441,108 | B1 | 8/2002 | Haendeler et al. |
| 6,444,763 | B1 | 9/2002 | Sagae et al. |
| 6,518,372 | B1 | 2/2003 | Weickert |
| 6,689,845 | B1 | 2/2004 | Govoni et al. |

FOREIGN PATENT DOCUMENTS

| | | |
|---|---|---|
| EP | 0 241 947 A2 | 10/1987 |
| EP | 0 381 364 A1 | 8/1990 |
| EP | 1 484 343 A1 | 12/2004 |
| GB | 845655 A | 8/1960 |
| GB | 954078 A | 4/1964 |
| GB | 1147273 A | 4/1969 |
| GB | 1 233 106 A | 5/1971 |
| GB | 1 351 624 A | 5/1974 |
| GB | 1 587 891 A | 4/1981 |
| GB | 2 077 628 A | 12/1981 |
| JP | 41-12916 B | 7/1941 |
| JP | 46-11670 B | 3/1971 |
| JP | 46-31969 | 9/1971 |
| JP | 47-42379 B | 10/1972 |
| JP | 58-201802 A | 11/1983 |
| JP | 58-216735 A | 12/1983 |
| JP | 59-42039 A | 3/1984 |
| JP | 59-21321 B2 | 5/1984 |
| JP | 59-126406 A | 7/1984 |
| JP | 2-233708 A | 9/1990 |
| JP | 2675919 B2 | 7/1997 |
| JP | 2002-515516 A | 5/2002 |
| JP | 2002-520426 A | 7/2002 |
| JP | 2002-537420 A | 11/2002 |
| WO | WO 93/24533 A1 | 12/1993 |
| WO | WO 99/59712 A1 | 11/1999 |
| WO | WO-2007/071527 A1 | 6/2007 |

OTHER PUBLICATIONS

Search Report from Singapore Application No. 200809158-9 dated Jun. 4, 2009.
Search Report from Singapore Application No. 200809157-1 dated Jun. 4, 2009.
Search Report from Singapore Application No. 200809159-7 dated Jun. 4, 2009.
Search Report from Singapore Application No. 200809161-3 dated Jun. 4, 2009.
Office Action in U.S. Appl. No. 12/332,112 mailed Jun. 3, 2010.
"Terminology Dictionary of Powder Technology, 2nd Edition", Editor Society of Power Technology, Nikkan Kogyo Shimbun-sha, 2000, p. 321.
Hattori et al., "Minimum spoutable gas flow rate in side-outlet spouted bed with inner draft-tube," Journal of Chemical Engineering of Japan, vol. 14, No. 6, Apr. 3, 1981, pp. 462-466.
Mathur et al., "Spouted Beds", Academic Press, 1974, pp. 114-116 and 279-280.
Perry et al., "Solids-Drying Equipement", Perry's Chemical Engineers' Handbook, McGraw-Hill, 1997, pp. 12-75 and 12-76.
Takeda et al., "Modified types of Spouted bed—With the gas outlet located in the side wall surrounding the annular dense bed," Kagaku Kogaku Ronbunshu 1, Kagaku Kogaku Kyokai, No. 2, 1975, pp. 149-154.

* cited by examiner

POWDER TRANSFER DEVICE AND POLYOLEFIN PRODUCTION PROCESS

BACKGROUND OF THE INVENTION

1. Field of the Invention

The present invention relates to a powder transfer device, and to a process for producing polyolefins using such a device.

2. Related Background Art

A tube called a "downcomer" that communicates between an upper stage and a lower stage has hitherto been known as a means for transferring powder from an upper stage to a lower stage in an apparatus such as a vertical multistage fluidized bed reactor (see, for example, U.S. Pat. No. 5,235,009).

With the use of such a downcomer, powder in an upper stage which has dropped into a downcomer from an opening in the top end of the downcomer falls gravitationally through the downcomer and is discharged from an opening at the bottom end of the downcomer, thereby enabling powder to be transferred from the upper stage to the lower stage.

However, in prior-art downcomers, the powder transfer rate cannot be controlled as desired. That is, the rate of powder transfer is determined primarily by such mechanical shape factors as the diameter of the downcomer and the positions of the top and bottom ends of the downcomer. Controlling the powder transfer rate has been difficult.

While it is conceivable to provide a mechanical valve on the downcomer for the purpose of controlling the flow rate of powder through the downcomer, installing a mechanical valve having a complicated structure within the device is undesirable because it will cause various problems.

SUMMARY OF THE INVENTION

It is therefore an object of the present invention to provide a powder transfer device which has a simple construction, yet enables the powder discharge rate to be easily controlled. Another object of the invention is to provide a polyolefin powder production process which uses such a device.

The powder transfer device according to one aspect of the present invention includes a downwardly extending downcomer and a gas slider which is situated below the downcomer. The gas slider has, on a side thereof facing an opening at a bottom end of the downcomer, a gas dispersion plate in which a plurality of gas outlets are formed.

An advantage of this invention is that when gas is blown from the gas dispersion plate in the gas slider so as to thoroughly fluidize powder that is present between the bottom end of the downcomer and the gas dispersion plate, the powder moves with great ease and can be readily induced to move laterally over the surface of the gas dispersion plate so that the powder is made to fall downward from the edge of the gas dispersion plate. To replenish the powder which has fallen down, additional powder is discharged onto the gas dispersion plate from the opening at the bottom end of the downcomer; that is, powder transfer takes place. Increasing the amount of gas blown from the gas dispersion plate enables the powder transfer rate to be increased.

Conversely, when the amount of gas blown from the gas dispersion plate in the gas slider is decreased or set to zero, thereby holding down the fluidized state of the powder between the bottom end of the downcomer and the gas dispersion plate of the gas slider or placing the powder in a non-fluidized state, the powder moves over the gas dispersion plate with greater difficulty. The amount of powder which falls down from the edge of the gas dispersion plate thus decreases, which in turn results in less powder being discharged from the opening at the bottom end of the tube onto the gas dispersion plate. Accordingly, the powder transfer rate can be decreased.

The gas dispersion plate may include a facing portion that directly faces the opening at the bottom end of the downcomer, and a peripheral portion that surrounds a perimeter of the facing portion at a width W. When $\theta r$ represents the angle of repose for the powder and L represents the distance between the bottom end of the downcomer and the gas dispersion plate, the width W of the peripheral portion satisfies the condition $W \geq L \cdot \cot(\theta r)$ at all points on the perimeter of the facing portion.

In this arrangement, by stopping the flow of gas from the gas outlets, a pile of powder in a non-fluidized state having an angle of slope equal to or less than the angle of repose $\theta r$ is formed on the gas dispersion plate and the powder ceases to fall down from the edge of the gas dispersion plate. It is possible in this way to stop powder discharge onto the gas dispersion plate from the opening at the bottom end of the downcomer, and to set the powder transfer rate to zero.

The olefin polymerization reactor according to another aspect of the invention includes a plurality of vertically arrayed polymerization stages, and the above-described powder transfer device of the invention which transfers polyolefin powder present in an upper polymerization stage to a lower polymerization stage.

The polyolefin production process according to yet another aspect of the invention includes the step of, in an olefin polymerization reactor having a plurality of vertically arrayed polymerization stages, transferring a polyolefin powder that is present in an upper polymerization stage to a lower polymerization stage with the above-described powder transfer device of the invention.

The foregoing aspects of the invention make it possible to control at will the transfer rate of an polyolefin powder between stages, thus enabling stable operation to be achieved. In particular, the presence of moving parts such as a mechanical valve in olefin polymerization tends to invite problems such as the sticking of polymer, but the above-described powder transfer device has no moving parts and is thus highly desirable.

The present invention provides a powder transfer device of simple construction which enables the discharge rate of a powder to be easily controlled. The invention also provides a polyolefin polymerization reactor and process which use such a device.

DESCRIPTION OF THE PREFERRED EMBODIMENTS

Figure 1:
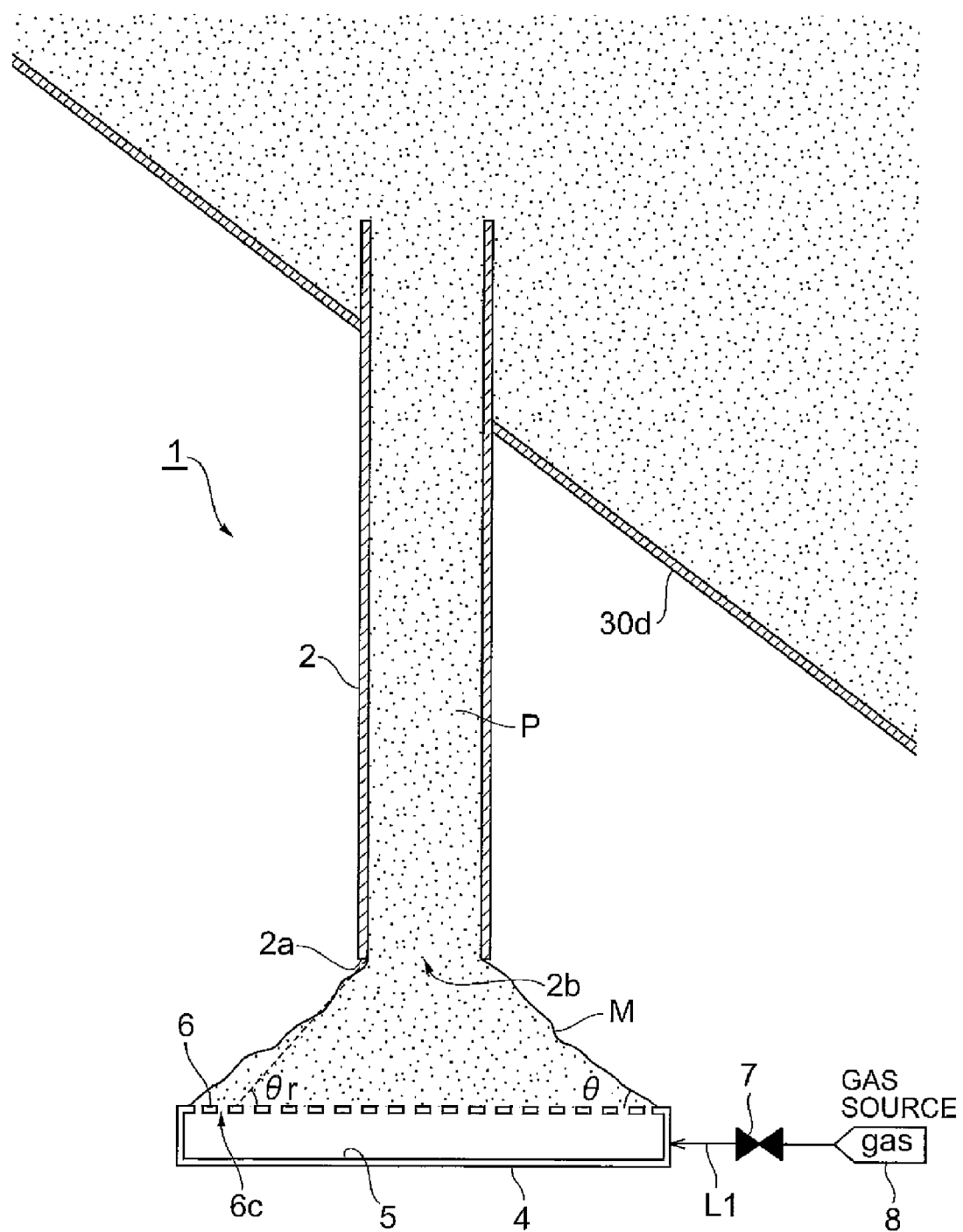
FIG. 1 is a schematic sectional view of a powder transfer device according to an embodiment of the present invention.

Preferred embodiments of the invention are described in detail below while referring to the attached diagrams. In the descriptions of the diagrams that follow, like or similar elements are referenced by like symbols and duplicate explanations are avoided. Also, relative dimensions of features shown in the diagrams may not be true to scale.

Powder Transfer Device

The powder transfer device according to the present embodiment includes primarily a downcomer 2 and a gas slider 4.

The downcomer 2 is a tube which extends in a substantially vertical direction, and which communicates at a top end thereof with the inside of a wall 30d of a vessel that holds a powder.

The gas slider 4 has a chamber 5 which forms a space, and a gas dispersion plate 6 provided on a top side of the chamber 5. The gas dispersion plate 6 has a large number of gas outlets 6c for blowing gas that is present within the chamber 5 upward. The form of the gas dispersion plate 6 is not subject to any particular limitation, and is exemplified by perforated plates (e.g., a punched plate screen), meshes and porous plates. Protective coverings such as bubble caps (not shown) may be provided over the gas outlets 6c in order to prevent powders from falling in the gas outlets. The material making up the gas dispersion plate 6 is exemplified by, but not particularly limited to, metals such as stainless steel and ceramics such as silica or alumina.

The size of the openings in the gas outlets 6c, although not subject to any particular limitation, is preferably smaller than the average particle size of the powder to be transferred. Also, from the standpoint of uniformly blowing out gas from each gas outlet 6c in the gas dispersion plate 6, it is preferable for the gas outlets 6c to have some degree of pressure loss. The size of the openings in the gas outlets 6c may be set within a range of, for example, from about several tens of microns to several millimeters.

The gas outlets 6c are preferably arranged at substantially equally spaced intervals in the gas dispersion plate 6.

The gas dispersion plate 6 is preferably disposed so that the surface thereof is horizontal.

Figure 2:
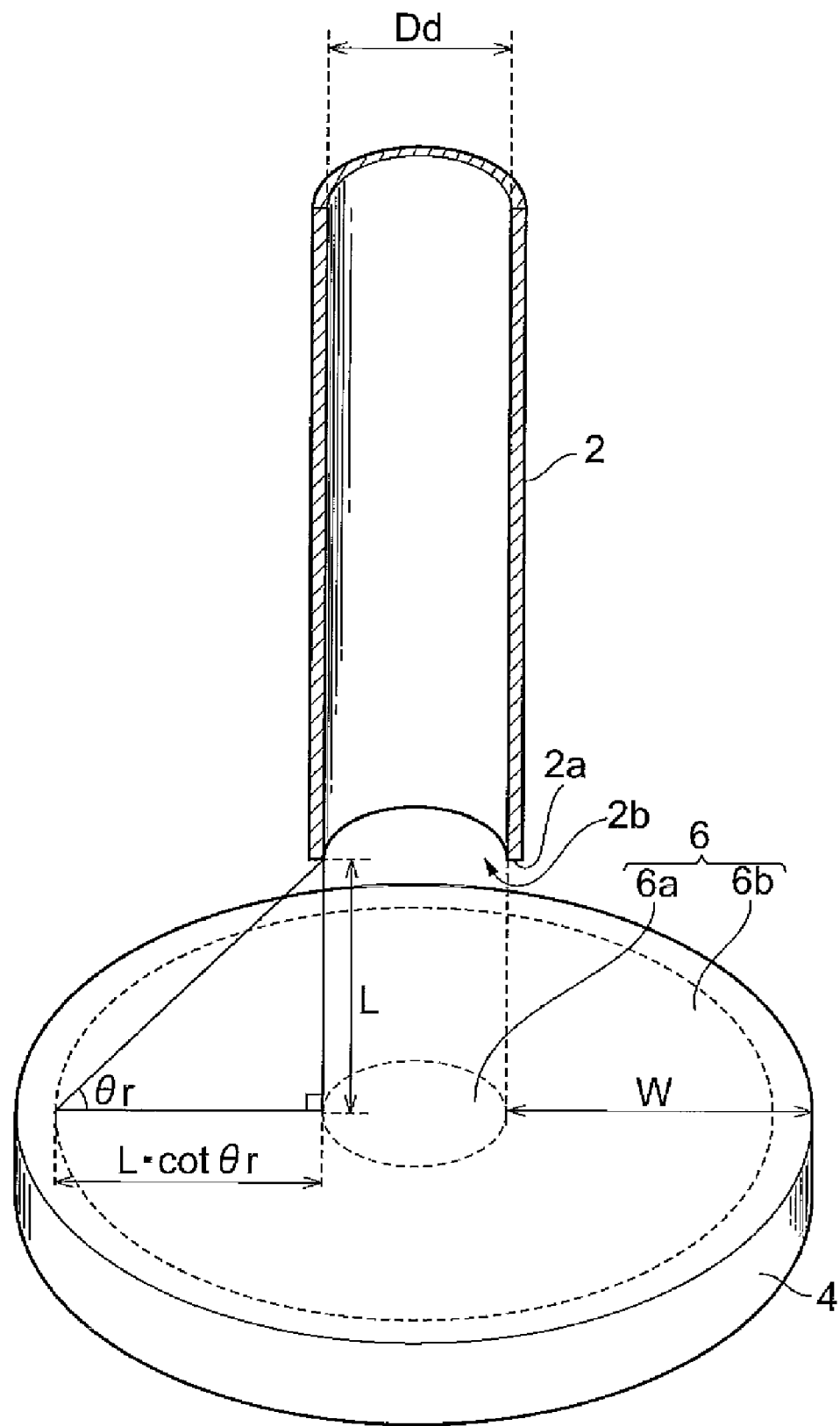
FIG. 2 is a partially fragmented perspective view of the vicinity of the gas dispersion plate 6 in FIG. 1.

The gas dispersion plate 6 is positioned so as to face an opening 2b at a bottom end 2a of the downcomer 2. More specifically, as shown in FIG. 2, the gas dispersion plate 6 has a facing portion 6a which directly faces the opening 2b at the bottom end 2a of the downcomer 2 and has the same diameter as the opening 2b, and a peripheral portion 6b which surrounds a perimeter of the facing portion 6a at a width W. Here, the width W is the distance from the perimeter of the facing portion 6a to the edge of the gas dispersion plate 6 in a direction perpendicular to the perimeter of the facing portion 6a, as seen from a direction perpendicular to the surface of the gas dispersion plate 6.

Here, letting the distance between the bottom end 2a of the downcomer 2 and the gas dispersion plate 6 be L, it is preferable for the width W of the peripheral portion 6b to satisfy the condition $W \geq L \cdot \cot(\theta r)$ at all points on the perimeter of the facing portion 6a. The symbol $\theta r$ represents the angle of repose for the powder to be transferred. The angle of repose is the maximum angle of slope at which a powder, when piled up, has a talus slope that is stable and does not collapse. The angle of repose $\theta r$ is a value that is measured in a state where gas does not flow through the powder bed.

The inside diameter Dd of the downcomer 2, while not subject to any particular limitation so long as particles can drop down through the interior of the tube, is preferably at least ten times the particle size of the powder.

Returning to FIG. 1, a gas source 8 is connected through a line L1 and a valve 7 to the chamber 5 in the gas slider 4.

No particular limitation is imposed on the type of gas from the gas source 8. Illustrative examples include air, monomer and nitrogen.

Next, the operation of such a powder transfer device 1 is described.

The particle size and material making up the powder used in this embodiment are not subject to any particular limitations. Illustrative examples of the material include polyolefin powders such as polypropylene, and ceramic powders such as silica. The particle size may be, for example, from about several tens of microns to about several millimeters.

First, as shown in FIG. 1, the valve 7 is closed so that gas does not flow out through the gas outlets 6c in the gas dispersion plate 6. Next, when a powder P is fed into the vessel 30d, some of the powder P drops down through the downcomer 2, subsequently being discharged from the opening 2b at the bottom end 2a of the downcomer 2 and transported onto the gas dispersion plate 6, where it forms a pile M of powder P with a peak at the opening 2b.

As shown in FIG. 2, the width W of the peripheral portion 6b of the gas dispersion plate 6 is set so as to satisfy the condition $W \geq L \cdot \cot(\theta r)$ at all points on the perimeter of the facing portion 6a. The slope angle $\theta$ at the foot of the pile M in FIG. 1, i.e., the angle $\theta$ that the talus slope of the pile M forms with the gas dispersion plate 6, generally does not exceed the angle of repose $\theta r$ of the powder.

Therefore, because the pile M is maintained on the gas dispersion plate 6 without collapsing and no dropping of the powder P off the edge of the gas dispersion plate 6 arises, the powder P ceases to discharge onto the gas dispersion plate 6 from the opening 2b at the bottom end 2a of the downcomer 2.

Figure 3:
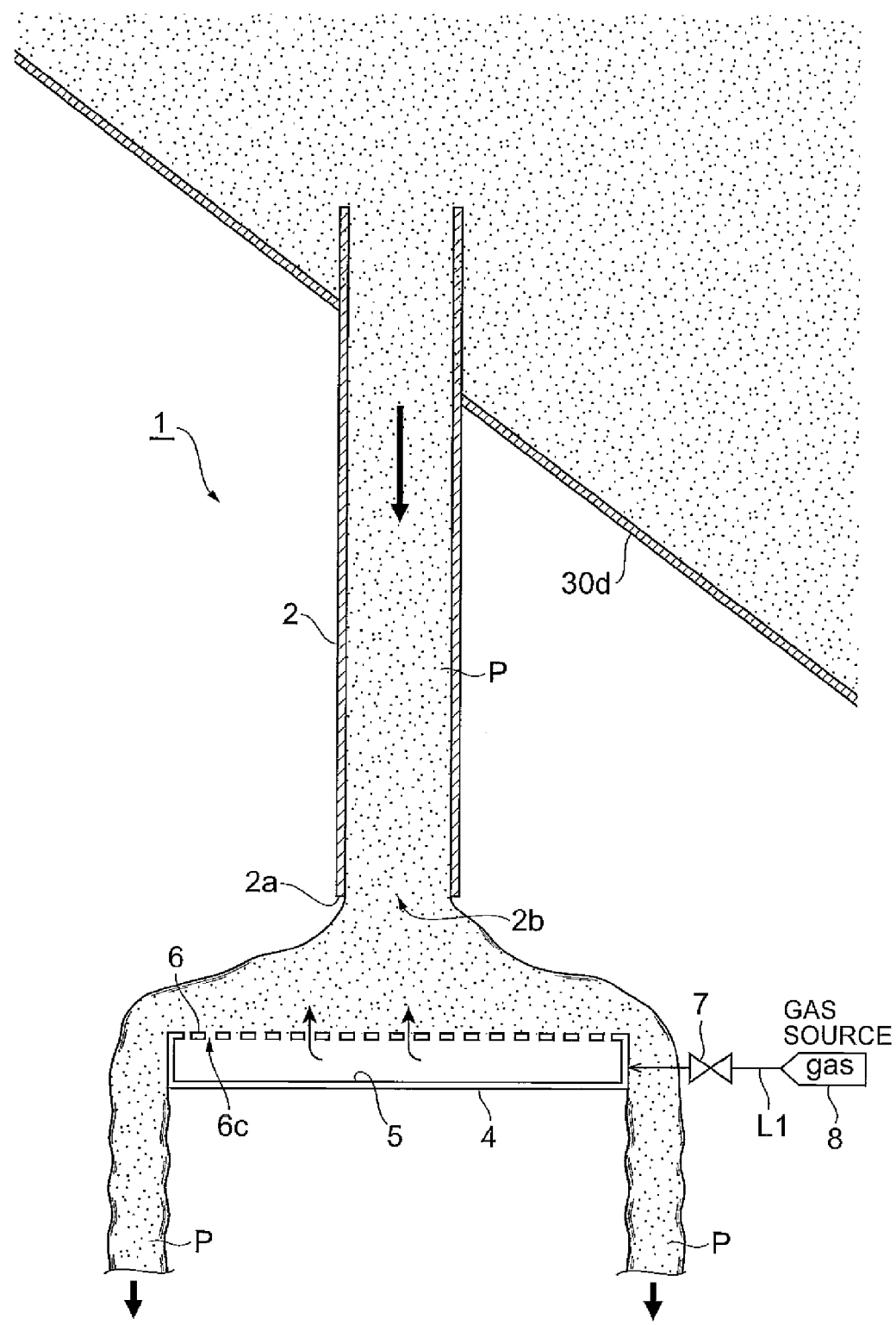
FIG. 3 is a schematic sectional view showing a state where gas is being blown out in the powder transfer device of FIG. 1.

Next, as shown in FIG. 3, the valve 7 is opened a given amount and gas is blown out through the gas outlets 6c of the gas dispersion plate 6. When the superficial velocity of the gas blown out from the gas dispersion plate 6 exceeds the minimum fluidization velocity of the powder P, the powder P fluidizes, facilitating movement of the powder P. In this specification, "superficial velocity" is the value obtained by dividing the flow rate of gas blown out from the gas dispersion plate 6 by the surface area of the gas dispersion plate 6.

In this way, as shown in FIG. 3, the powder P making up the pile M on the gas dispersion plate 6 (see FIG. 1) is easily moved over the gas dispersion plate 6 and made to drop down from the edge of the gas dispersion plate 6. The powder P is continuously fed over the gas dispersion plate 6 from the opening 2b at the bottom end 2a of the downcomer 2 so as to replenish the powder P that has fallen off the gas dispersion plate 6. It is possible in this way to transfer the powder P through the downcomer 2.

When the superficial velocity of the gas blown out from the gas dispersion plate 6 is varied within a range at or greater than the minimum fluidization velocity of the powder, the ease of flow by the fluidized powder varies in response. That is, the higher the value to which the superficial velocity is set, the more easily the fluidized powder flows and, in turn, the more easily the powder P falls from the edge of the gas dispersion plate 6. Hence, the transfer rate of the powder P can be controlled by controlling the superficial velocity.

The invention is not limited to the above embodiment. Various other embodiments may be contemplated.

For example, in the above-described embodiment, the width W of the peripheral portion 6b of the gas dispersion plate 6 is provided in such a way as to satisfy the condition $W \geq L \cdot \cot(\theta r)$ at all points on the perimeter of the facing portion 6a. However, the present invention may be worked even if the condition $W \geq L \cdot \cot(\theta r)$ is satisfied over only a portion of the perimeter of the facing portion 6a, or even if $W \geq L \cdot \cot(\theta r)$ is nowhere satisfied. In such a case, even in a state where gas is not made to flow, the powder will fall down from places where $W \leq L \cdot \cot(\theta r)$ and it will not be possible to set the powder transfer rate to zero. However, it will remain possible to vary the powder transfer rate by varying the gas superficial velocity.

The downcomer 2 need not have a cross-sectional shape that is circular, and may instead be rectangular or have some other suitable cross-sectional shape. Moreover, the external shape of the gas dispersion plate 6, i.e., the planar shape, is not limited to a circular shape, and may alternatively be rectangular or have some other suitable shape.

The downcomer 2 need not be straight, provided the bottom end extends downwardly. For example, the tube may be curved. Also, the downcomer 2 need not necessary extend downward in a vertical direction, and may instead be inclined at an angle to the vertical.

Also, the gas blown out from the gas dispersion plate 6 may be a pulsating flow.

Polyolefin Production Unit

Next, examples of a polyolefin production unit and a production process which use the above-described powder transfer device 1 are described. Here, a polyolefin production system and process which use an olefin polymerization unit wherein the above-described powder transfer device 1 transfers a polyolefin powder that is present in an upper stage reactor of a gas phase spouted bed-type multistage polymerization reactor to a lower stage reactor are described.

Polyolefin Production System

Figure 4:
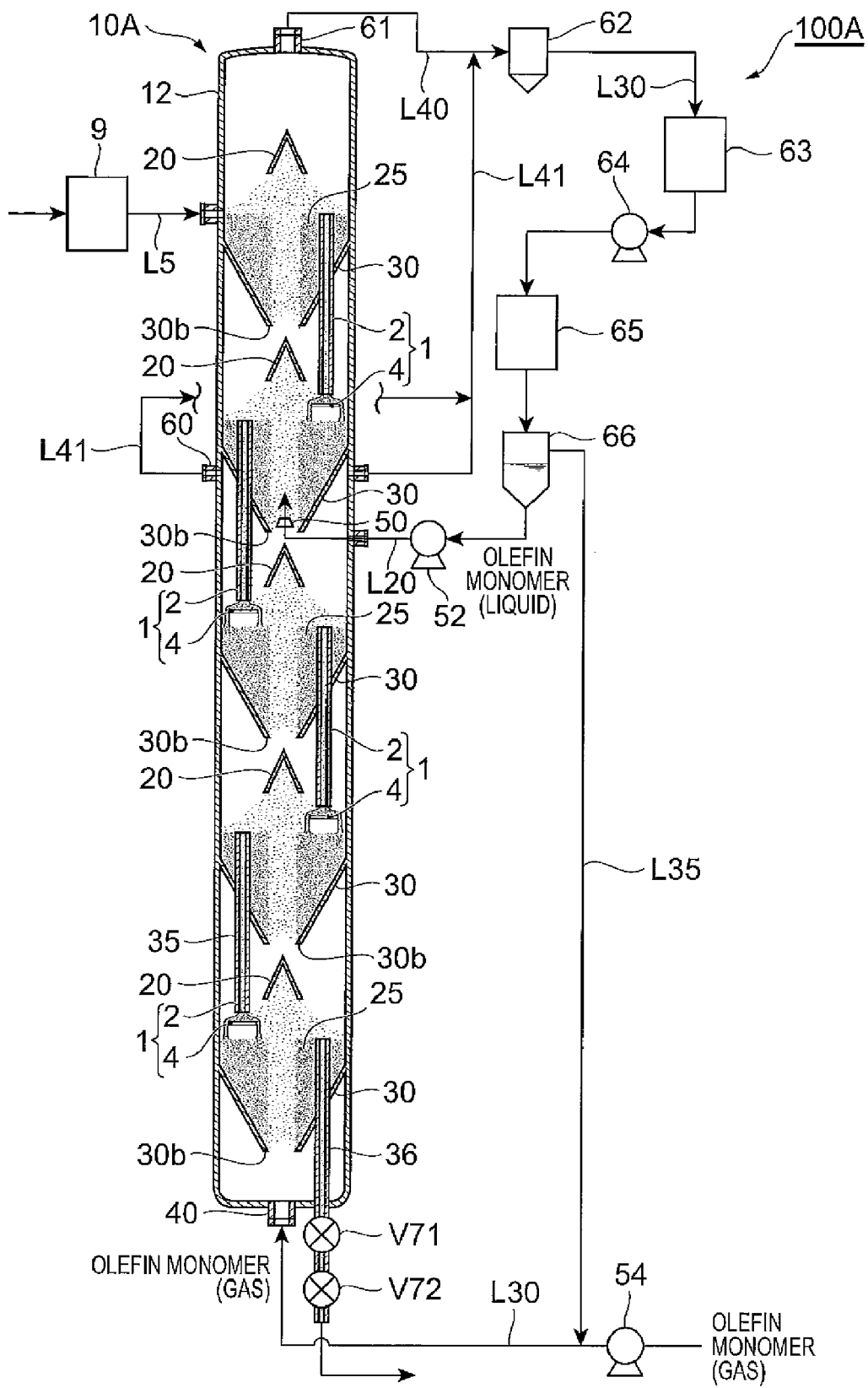
FIG. 4 is a schematic structural view showing an embodiment of a polyolefin production system which includes powder transfer devices of the type shown in FIG. 1.

FIG. 4 shows a polyolefin production system 100A according to the present embodiment. This production system 100A includes an olefin prepolymerization reactor 9, and an olefin polymerization reactor 10A which is connected as a subsequent stage to the olefin prepolymerization reactor 9.

Olefin Prepolymerization Reactor

The olefin prepolymerization reactor 9 polymerizes olefin in the presence of an olefin polymerization catalyst to form a polyolefin powder.

Examples of the olefin prepolymerization reactor 9 include, but are not particularly limited to, slurry polymerization reactors, bulk polymerization reactors, stirred tank-type gas phase polymerization reactors, and fluidized bed-type gas phase polymerization reactors. A single reactor, a plurality of reactors of the same type, or a combination of two or more such reactors of differing types may be used.

Slurry polymerization reactors that may be used include known polymerization reactors, such as the stirred tank-type reactors and loop-type reactors described in Japanese Patent Publication No. S 41-12916, Japanese Patent Publication No. S 46-11670 and Japanese Patent Publication No. S 47-42379. Slurry polymerization is a process in which a polymerization solvent is prepared by adding an olefin monomer such as propylene or butene to an inert solvent such as an aliphatic hydrocarbon (e.g., propane, butane, isobutane, pentane, hexane, heptane, octane) or an alicyclic hydrocarbon (e.g., cyclopentane, cyclohexane), an olefin polymerization catalyst is dispersed in the polymerization solvent to form a slurry, and polymerization is carried out in a state where the polymer that is formed does not dissolve in the polymerization solvent. Polymerization is carried out at a temperature and pressure at which the polymerization solvent is maintained in a liquid state and the polymer that is formed does not dissolve in the polymerization solvent. The polymerization temperature is generally from 30 to 100° C., and preferably from 50 to 80° C. The polymerization pressure is generally from standard pressure to 10 MPaG, and preferably from 0.3 to 5 MPaG.

Bulk polymerization reactors that may be used include known polymerization reactors, such as the stirred tank-type reactors and loop-type reactors described in Japanese Patent Publication No. S 41-12916, Japanese Patent Publication No. S 46-11670 and Japanese Patent Publication No. S 47-42379. Bulk polymerization is a process in which an olefin monomer such as propylene or butene is used as the polymerization solvent in the substantial absence of inert solvents such as aliphatic hydrocarbons (e.g., propane, butane, isobutane, pentane, hexane, heptane, octane) and alicyclic hydrocarbons (e.g., cyclopentane, cyclohexane), an olefin polymerization catalyst is dispersed in the polymerization solvent, and polymerization is carried out in a state where the polymer that is formed does not dissolve in the polymerization solvent. Polymerization is carried out at a temperature and pressure at which the polymerization solvent is maintained in a liquid state and the polymer that is formed does not dissolve in the polymerization solvent. The polymerization temperature is generally from 30 to 100° C., and preferably from 50 to 80° C. The polymerization pressure is generally from standard pressure to 10 MPaG, and preferably from 0.5 to 5 MPaG.

Stirred tank-type gas phase polymerization reactors that may be used include known polymerization reactors, such as the reactors described in Japanese Patent Application Laid-open No. S 46-31696 and Japanese Patent Application No. S 59-21321. Stirred tank-type gas phase polymerization is a process in which a monomer in a gaseous state is used as the medium and, while maintaining an olefin polymerization catalyst and olefin polymer in a flowing state within the medium by means of an agitator, the monomer in the gaseous state is polymerized. The polymerization temperature is generally from 50 to 110° C., and preferably from 60 to 100° C. The polymerization pressure should be in a range at which the olefin can be present as a vapor phase within the stirred tank-type gas phase polymerization reactor, and is generally from standard pressure to 5 MPaG, and preferably from 0.5 to 3 MPaG.

Fluidized bed-type gas phase polymerization reactors that may be used include known reactors, such as the reactors described in Japanese Patent Application Laid-open No. S 58-201802, Japanese Patent Application Laid-open No. S 59-126406 and Japanese Patent Application Laid-open No. H 2-233708. Fluidized bed-type gas phase polymerization is a process in which a monomer in a gaseous state is used as the medium and, while maintaining primarily an olefin polymerization catalyst and olefin polymer in a fluidized state within the medium by the flow of the medium, the monomer in the gaseous state is polymerized. In some cases, an agitator is also provided to promote fluidization. The polymerization temperature is generally from 0 to 120° C., preferably from 20 to 100° C., and more preferably from 40 to 100° C. The polymerization pressure should be in a range at which the olefin can be present as a vapor phase within the fluidized bed-type reactor, and is generally from standard pressure to 10 MPaG, preferably from 0.2 to 8 MPaG, and more preferably from 0.5 to 5 MPaG.

Combinations of different reactors are exemplified by a slurry polymerization reactor or a bulk polymerization reactor, to which is connected, as the subsequent stage, a fluidized bed-type gas phase polymerization reactor or a stirred tank-type gas phase polymerization reactor.

Alternatively, a flushing tank for separating unreacted olefin or polymerization solvent from olefin polymer powder may generally be provided between a slurry polymerization reactor or a bulk polymerization reactor and, connected thereto as the subsequent stage, a gas phase polymerization reactor such as a fluidized bed-type gas phase polymerization reactor, a stirred tank-type gas phase polymerization reactor or the subsequently described olefin polymerization reactor 10A. However, the installation of a flushing tank is not always required between a bulk polymerization reactor and a gas phase polymerization reactor connected thereafter.

Olefin Polymerization Reactor

The olefin polymerization reactor 10A is a reactor which carries out, in a substantially gas phase state, an olefin polymerization reaction on a polyolefin powder formed by the olefin prepolymerization reactor 9.

Referring to FIG. 4, the olefin polymerization reactor 10A is composed primarily of a vertically extending cylinder 12, a plurality of deflectors 20 provided inside the cylinder 12, and a plurality of tubular baffles (decreasing diameter members) 30 provided inside the cylinder 12. The deflectors 20 and tubular baffles 30 are alternately disposed in the axial direction of the cylinder 12. Also, it is preferable for both the deflectors 20 and the tubular baffles 30 to be disposed coaxially with the center axis of the cylinder 12.

In the olefin polymerization reactor 10A, five polymerization stages 25 are formed in a vertical row inside the cylinder 12. Each polymerization stage 25 is a region enclosed by the outside surface of a tubular baffle 30, the inside surface of the tubular baffle 30 directly below, and the inside surface of the portion of the cylinder 12 between these two tubular baffles 30. The topmost polymerization stage 25 is a region enclosed by the inside surface of the cylinder 12 at the top thereof, the inside surface of the tubular baffle 30 directly below the top of the cylinder 12, and the inside surface of the portion of the cylinder 12 therebetween.

Within each polymerization stage 25, an olefin-containing gas flows upward at a high velocity from a gas inlet orifice formed at a bottom end 30b of the tubular baffle 30, thereby forming a spouted bed of polyolefin powder.

Figure 5:
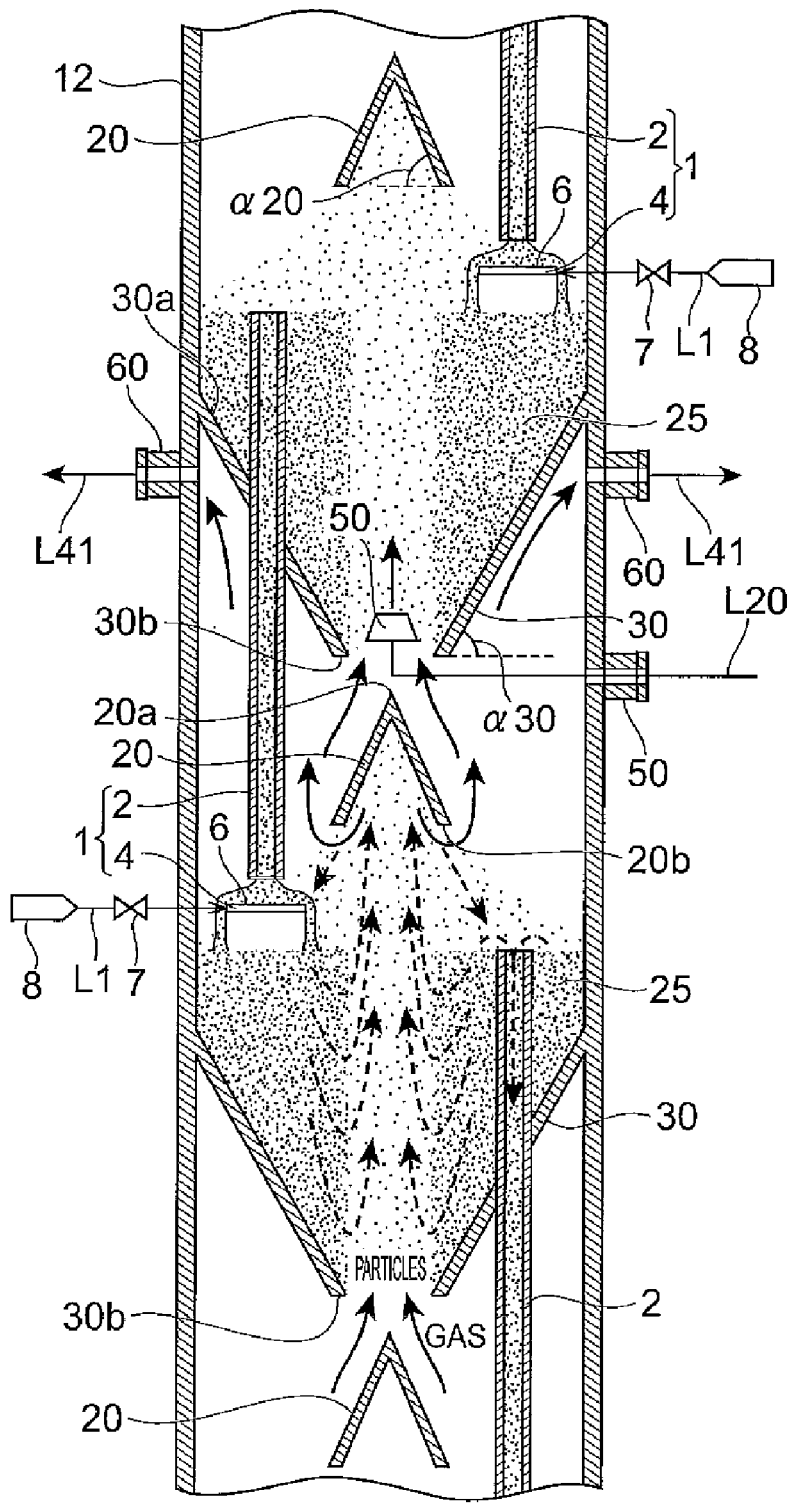
FIG. 5 is an enlarged schematic sectional view of the olefin polymerization reactor 10A shown in FIG. 4.

As shown in FIG. 5, in each polymerization stage 25, a deflector 20 is disposed at a position that lies above the tubular baffle 30 and faces the gas inlet orifice. The role of the deflector 20 is to prevent spouted polyolefin powder from scattering. This makes it possible to shorten the freeboard zone, enabling a high volume efficiency to be achieved.

The deflector 20 has a conical shape with a top end 20a that is closed, an outside diameter which increases progressively downward, and a bottom end 20b that is spaced apart from the inside wall of the cylinder 12. As a result, powder that has been blown upward collides with the inside surface of the deflector 20 and is taken up into the annular structure of the spouted bed. At the same time, gases circulate upward by passing between the bottom end 20b of the deflector 20 and the inner wall of the cylinder 12.

Each tubular baffle 30 is a tapered cylinder which has an inside diameter that progressively decreases in the downward direction, and has a top end 30a that is contiguous with the inside wall of the cylinder 12. Such an arrangement allows gases to circulate upward from a circular gas inlet orifice at a bottom end 30b of the tubular baffle 30, but does not allow the gases to circulate upward between the top end 30a and the cylinder 12. The gas inlet orifice formed at the bottom end 30b may have disposed thereon a check valve (not shown) so that polyolefin powder within the polymerization stage 25 does not flow downward through the gas inlet orifice at such times as startup or temporary shutdown of the olefin polymerization reactor 10A.

As shown in FIG. 4, four upper downcomers 2 are provided so as to pass through each of the four upper tubular baffles 30 within the cylinder 12, and a bottom downcomer 36 is provided in the lowermost tubular baffle 30. A gas slider 4 of the type described above is provided below each upper downcomer 2; the upper downcomer 2 and the gas slider 4 together make up the above-described powder transfer device 1. As shown in FIG. 5, a gas source 8 is connected through a valve 7 and a line L1 to the gas slider 4. In this embodiment, gases such as olefin monomer of the same type as that supplied through line L30, hydrogen and inert gases can be supplied from the gas source 8. The powder transfer device 1 allows the polyolefin powder to fall from an upper polymerization stage 25 to a lower polymerization stage 25.

Returning to FIG. 4, the purpose of the bottom downcomer 36 is to remove polyolefin powder from the lowermost polymerization stage and discharge the powder outside of the cylinder 12. Two valves V71 and V72 are arranged in series with the bottom downcomer 36. The polyolefin powder can be discharged in a subsequent step by successively opening and closing these valves V71 and V72.

To form a stable spouted bed in each polymerization stage 25, it is desirable that each tubular baffle 30 satisfy the following conditions. Namely, the ratio $d_A/d_B$ between the diameter $d_A$ of the gas inlet orifice at the bottom end 30b of the tubular baffle 30 and the inside diameter $d_B$ of the cylinder 12 is preferably 0.35 or less. Also, the angle of inclination $\alpha 30$ of the tubular baffle 30 in FIG. 2, i.e., the angle of the inside surface of the tubular baffle 30 with the horizontal, is preferably at least the angle of repose for the polyolefin powder present within the cylinder 12. The angle of inclination $\alpha 30$ is more preferably at least the angle of repose and at least the angle at which the polyolefin powder can be completely discharged gravitationally. In this way, smooth downward movement of the polyolefin powder is achieved.

Although a spouted bed can be formed using even a flat plate with a gas inlet orifice formed therein instead of a tubular baffle 30, a region where the powder does not fluidize will arise on such a flat plate near the inside surface of the cylinder 12. As a result, due to poor heat removal in this region, the powder may fuse into a mass. To avoid such a situation, it is thus desirable for the tubular baffles 30 to have an angle of inclination $\alpha 30$ which, as noted above, is at least a given angle.

It is preferable for the deflectors 20 in FIG. 5 to have an angle of inclination $\alpha 20$, i.e., the angle formed between the outside surface of the deflector 20 and the horizontal, which is at least the angle of repose for polyolefin powder present within the cylinder 12. In this way, polyolefin powder can be adequately prevented from sticking to the deflectors 20.

Polyolefin powder has an angle of repose of, for example, from about 35° to about 50°. The angles of inclination $\alpha 30$ and $\alpha 20$ are both preferably at least 55°.

The deflectors 20 and tubular baffles 30 are each attached to the cylinder 12 by supports (not shown). The supports have substantially no influence on gas flow and polyolefin flow. The material of the cylinder 12, the deflector 20 and the tubular baffle 30 can be, for example, carbon steels, SUS304 and SUS316L. The SUS304 and SUS316L are standards of stainless steel defined in JIS (Japanese Industrial Standards). The SUS316L is preferable when catalyst having much corrosive component (for example, halogen component as C1) is used.

As shown in FIG. 4, an olefin monomer gas feeding nozzle 40 is provided at the bottom of the cylinder 12, and gaseous olefin monomer is fed to the bottom of the cylinder 12 by way of a line L30 and a compressor 54. In addition to the gas feeding nozzle 40, a discharge nozzle (not shown) which is capable of discharging polyolefin particles at the end of reactor operation may also be provided at the bottom of the cylinder 12. Also, to reduce the amount of powder remaining inside the reactor at the end of reactor operation, an interior member in the shape of an inverted cone (not shown) may be provided at a position which does not interfere with gas flow.

A gas discharge nozzle 61 is provided at the top of the cylinder 12. Gas which has risen up through the cylinder 12 is discharged to the exterior through a line L40, and gas-entrained powder is removed by an optionally provided cyclone 62. The gas passes through a first heat exchanger 63, a compressor 64, a second heat exchanger 65 and a gas-liquid separator 66, then is introduced to line L30 via another line L35 and recycled.

The cylinder 12 is also provided with a liquid feed nozzle 50 which feeds, from outside the cylinder 12 to a given polymerization stage 25, liquid olefin that has been separated by the gas-liquid separator 66. Specifically, as shown in FIG. 4, a liquid feed nozzle 50 is situated near the gas inlet orifice of the second tubular baffle 30 from the top so as to inject liquid olefin toward the spout. A pump 52 and a line L20 for feeding the liquefied olefin monomer in case of necessity are connected to the liquid feed nozzle 50.

Also, a plurality of gas discharge nozzles 60 are provided in portions of the cylinder 12 facing the outside surfaces of the tubular baffles 30. More specifically, as shown in FIG. 4, a gas discharge nozzle 60 is provided in the portion of the cylinder 12 facing the outside surface of the second tubular baffle 30 from the top. This gas discharge nozzle 60 is connected to line L40 by way of a line L41. The amount of gas discharged from the gas discharge nozzles 60 is controlled by respective valves or other means so as to be substantially equal to the amount of gas that has been fed in from the liquid feed nozzle 50 and vaporized. Therefore, even when liquefied olefin monomer has been fed into the cylinder 12 via the liquid feed nozzle 50, the superficial velocity of the gas inside the cylinder 12 is kept substantially constant in the vertical direction. The liquid feed nozzle 50, while not limited to being disposed in the above-indicated position, is preferably placed in a high gas velocity region, such as the above-mentioned spouting area. Alternatively, in cases where a deflector 20 is provided, the liquid feed nozzle 50 may be disposed below the deflector 20.

In addition, a line L5 is connected to a position on the cylinder 12 which is higher than the topmost tubular baffle 30, and polyolefin powder containing olefin polymerization catalyst solid powder is fed through this line L5 to the topmost polymerization stage 25.

Accordingly, in the present embodiment, a two-stage polymerization step is achieved by the olefin prepolymerization reactor 9 and the olefin polymerization reactor 10A. In this way, the olefin prepolymerization reactor 5 effects the polymerization and growth of polyolefin particles, creating relatively large polyolefin particles having a particle size of preferably at least 500 μm, more preferably at least 700 μm, and even more preferably at least 850 μm, thereby enabling the formation of a more stable spouted bed. However, it is also possible to have the polymerization step be composed of a single stage that does not include an olefin prepolymerization reactor 9. In this case, a solid catalyst for olefin polymerization or a prepolymerization catalyst is fed directly to the olefin polymerization reactor 10A, and olefin polymerization is carried out. Alternatively, one or more additional olefin polymerization reactor, such as an olefin prepolymerization reactor 9 or an olefin polymerization reactor 10A, may be provided subsequent to the olefin polymerization reactor 10A so as to achieve a polymerization step composed of three or more stages.

Olefin, Polyolefin and Catalyst

Next, the olefin, polyolefin, catalyst and other substances used in such a system are described.

In the olefin polymerization reactor, polyolefin production process and polyolefin production system of the invention, polyolefin—i.e., olefin polymer (olefin homopolymer, olefin copolymer)—production is carried out by the polymerization of one or more olefin (homopolymerization or copolymerization). Examples of olefins that may be used in this invention include ethylene, propylene, 1-butene, 1-pentene, 4-methyl-1-pentene, 5-methyl-1-hexene, 1-hexene, 1-heptene and 1-octene.

One or more of these olefins may be used. Alternatively, the olefin used may be changed in each polymerization step In cases where polymerization is carried out as a multistage process, a different olefin may be used in each stage. When two or more olefins are used, examples of suitable olefin combinations that may be employed include propylene/ethylene, propylene/1-butene, propylene/ethylene/1-butene, ethylene/1-butene, ethylene/1-hexene and ethylene/1-octene. In addition to olefins, it is also possible to use at the same time various copolymeric ingredients such as dienes.

Olefin polymers (homopolymers, copolymers) such as propylene homopolymers, propylene/ethylene copolymers, propylene/1-butene copolymers and propylene/ethylene/1-butene copolymers may be advantageously produced in the present invention. The production of olefin polymers obtained by multistage polymerization in which the proportions of the monomer units serving as the polymer ingredients differ in the respective stages is especially preferred. For example, it is possible to form a multistage-polymerized olefin copolymer by feeding one type of olefin to an olefin prepolymerization reactor 5 and an olefin polymerization reactor 10A so as to form homopolymer particles, or copolymerizing the first olefin with a small amount of another olefin to form random copolymer particles, then feeding, in a subsequent stage, two or more types of olefin to these polymer particles in an additional olefin polymerization reactor such as an olefin prepolymerization reactor 5 or an olefin polymerization reactor 10A. This results in a narrow residence time distribution in the olefin polymerization reactor 10A, making it easy to achieve a fixed compositional ratio within the polymer particles. This approach is especially effective for reducing molding defects.

Examples of such polymers include propylene-propylene/ethylene polymers, propylene-propylene/ethylene-propylene/ethylene polymers, propylene/ethylene-propylene/ethylene polymers and propylene-propylene/ethylene/1-butene polymers. Here, a dash ("-") indicates the boundary between polymers, and a slash ("/") indicates that two or more olefins are copolymerized within the polymer. Of these, the production of multistage-polymerized propylene-based copolymers which are polymers having propylene-based monomer units, are called "high-impact polypropylene" (in Japan, also customarily called "polypropylene block copolymers"), and have crystalline propylene-based polymer segments and amorphous propylene-based polymer segments, is preferred. A multistage polymerized propylene-based copolymer can be prepared by the continuous multistage polymerization, in any order, of crystalline homopolypropylene segments or random copolymer segments obtained by copolymerizing a small amount of an olefin other than propylene, with amorphous rubber segments copolymerized from ethylene, propylene and, as an optional ingredient, an olefin other than ethylene and propylene, in the presence of the respective polymers. Such a copolymer has an intrinsic viscosity, as measured in 1,2,3,4-tetrahydronaphthalene at 135° C., which is preferably in a range of from 0.1 to 100 dl/g. This multistage polymerized polypropylene-based copolymer has excellent heat resistance, rigidity and impact resistance, and can therefore be used in automotive components such as bumpers and door trim, and in various packaging containers such as retortable food packaging containers.

Moreover, in the olefin polymerization reactor and polyolefin production process of the invention, to broaden the molecular weight distribution of the olefin polymer, the olefin polymer components produced in respective polymerization steps may be given different molecular weights. The present invention is also advantageous for producing olefin polymers having a broad molecular weight distribution. For example, the intrinsic viscosity obtained by measurement as described above for the polymer component obtained in the polymerization step that produces the highest molecular weight polymer component is in a range of preferably from 0.5 to 100 dl/g, more preferably from 1 to 50 dl/g, and even more preferably from 2 to 20 dl/g. This intrinsic viscosity is at least five times the intrinsic viscosity of the polymer component obtained in the polymerization step that produces the lowest molecular weight polymer component. The present invention can advantageously produce an olefin polymer in which the amount of the polymer component obtained in the polymerization step which produces the highest molecular weight polymer component accounts for from 0.1 to 80 wt % of the olefin polymer.

The olefin polymerization catalyst used in the invention may be a known addition polymerization catalyst used in olefin polymerization. Illustrative examples include Ziegler-type solid catalysts formed by contacting a solid catalyst component containing titanium, magnesium, a halogen and an electron donor (referred to below as "catalyst component A") with an organoaluminum compound component and an electron donor component; and metallocene-type solid catalysts prepared by supporting a metallocene compound and a cocatalyst component on a granular carrier. Combinations of these catalysts may also be used.

What is commonly referred to as a titanium/magnesium composite catalyst may be used as catalyst component A employed in the preparation of a Ziegler-type solid catalyst. This composite catalyst may be obtained by contacting a titanium compound, a magnesium compound and an electron donor such as the following.

Titanium compounds that may be used to prepare catalyst component A are exemplified by titanium compounds having the general formula $Ti(OR^1)_aX_{4-a}$ (where $R^1$ is a hydrocarbon group of 1 to 20 carbons, X is a halogen atom, and the letter a is a number such that $0 \leq a \leq 4$). Illustrative examples include tetrahalogenated titanium compounds such as titanium tetrachloride; trihalogenated alkoxytitanium compounds such as ethoxytitanium trichloride and butoxytitanium trichloride; dihalogenated dialkoxytitanium compounds such as diethoxytitanium dichloride and dibutoxytitanium dichloride; monohalogenated trialkoxytitanium compounds such as triethoxytitanium chloride and tributoxytitanium chloride; and tetraalkoxytitanium compounds such as tetraethoxytitanium and tetrabutoxytitanium. These titanium compounds may be used singly or as combinations of two or more thereof.

Magnesium compounds that may be used to prepare catalyst component A are exemplified by magnesium compounds which have a magnesium-carbon bond or a magnesium-hydrogen bond and have a reducing ability, and magnesium compounds which lack a reducing ability. Illustrative examples of magnesium compounds which have a reducing ability include dialkylmagnesium compounds such as dimethylmagnesium, diethylmagnesium, dibutylmagnesium and butylethylmagnesium; alkylmagnesium halides such as butylmagnesium chloride; alkylalkoxymagnesium compounds such as butylethoxymagnesium; and alkylmagnesium hydrides such as butylmagnesium hydride. These magnesium compounds having a reducing ability may also be used in the form of a complex compound with an organoaluminum compound.

Illustrative examples of magnesium compounds which lack a reducing ability include dihalogenated magnesium compounds such as magnesium dichloride; alkoxymagnesium halides such as methoxymagnesium chloride, ethoxymagnesium chloride and butoxymagnesium chloride; dialkoxymagnesium compounds such as diethoxymagnesium and dibutoxymagnesium; and magnesium carboxylates such as magnesium laurate and magnesium stearate. These magnesium compounds which lack a reducing ability may be compounds which are synthesized, either in advance or at the time of catalyst component A preparation, by a known method from a magnesium compound having a reducing ability.

Electron donors that may be used to prepare catalyst component A include oxygen-containing electron donors such as alcohols, phenols, ketones, aldehydes, carboxylic acids, esters of organic or inorganic acids, ethers, acid amides and acid anhydrides; nitrogen-containing electron donors such as ammonia, amines, nitriles and isocyanates; and organic acid halides. Of these electron donors, the use of inorganic acid esters, organic acid esters and ethers is preferred.

Preferred inorganic acid esters include silicon compounds having the general formula $R^2_nSi(OR^3)_{4-n}$ (where $R^2$ is a hydrocarbon group of 1 to 20 carbons or a hydrogen atom, $R^3$ is a hydrocarbon group of 1 to 20 carbons, and the letter n is a number such that $0 \leq n \leq 4$). Illustrative examples include tetraalkoxysilanes such as tetramethoxysilane, tetraethoxysilane and tetrabutoxysilane; alkyltrialkoxysilanes such as methyltrimethoxysilane, ethyltrimethoxysilane, butyltrimethoxysilane, isobutyltrimethoxysilane, t-butyltrimethoxysilane, methyltriethoxysilane, ethyltriethoxysilane, butyltriethoxysilane, isobutyltriethoxysilane and t-butyltriethoxysilane; and dialkyldialkoxysilanes such as dimethyldimethoxysilane, diethyldimethoxsilane, dibutyldimethoxysilane, diisobutyldimethoxysilane, di-t-butyldimethoxysilane, butylmethyldimethoxysilane, butylethyldimethoxysilane, t-butylmethyldimethoxysilane, dimethyldiethoxysilane, diethyldiethoxysilane, dibutyldiethoxysilane, diisobutyldiethoxysilane, di-t-butyldiethoxysilane, butylmethyldiethoxysilane, butylethyldiethoxysilane and t-butylmethyldiethoxysilane.

Preferred organic acid esters include monofunctional and polyfunctional carboxylic acid esters, such as aliphatic carboxylic acid esters, alicyclic carboxylic acid esters and aromatic carboxylic acid esters. Illustrative examples include methyl acetate, ethyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, diethyl phthalate, di-n-butyl phthalate and diisobutyl phthalate. Preferred examples include unsaturated aliphatic carboxylic acid esters such as methacrylic acid esters, phthalic acid esters, and maleic acid esters. Phthalic acid diesters are more preferred.

Illustrative examples of ethers include dialkyl ethers such as diethyl ether, dibutyl ether, diisobutyl ether, diamyl ether, diisoamyl ether, methyl butyl ether, methyl isoamyl ether and ethyl isobutyl ether. Preferred examples include dibutyl ether and diisoamyl ether.

Illustrative examples of organic acid halides include mono- and polyfunctional carboxylic acid halides, such as aliphatic carboxylic acid halides, alicyclic carboxylic acid halides and aromatic carboxylic acid halides. Illustrative examples include acetyl chloride, propionyl chloride, butyryl chloride, valeroyl chloride, acryloyl chloride, methacryloyl chloride, benzoyl chloride, toluoyl chloride, anisoyl chloride, succinyl chloride, malonyl chloride, maleyl chloride, itaconyl chloride and phthaloyl chloride. Preferred examples include aromatic carboxylic acid chlorides such as benzoyl chloride, toluoyl chloride and phthaloyl chloride. Phthaloyl chloride is especially preferred.

Examples of methods for preparing catalyst component A include the following.

(1) Reacting a liquid magnesium compound, or a complex compound of a magnesium compound and an electron donor, with a precipitating agent, then treating with a titanium compound or with a titanium compound and an electron donor.

(2) Treating a solid magnesium compound, or a complex compound of a solid magnesium compound and an electron donor, with a titanium compound or with a titanium compound and an electron donor.

(3) Reacting a liquid magnesium compound with a liquid titanium compound in the presence of an electron donor, and inducing the precipitation of a solid titanium complex.

(4) Further treating the reaction product obtained in method (1), (2) or (3) above with a titanium compound, or with an electron donor and a titanium compound.

(5) A method in which a solid product obtained by reducing an alkoxytitanium compound with an organomagnesium compound such as a Grignard reagent in the presence of an organosilicon compound having a Si—O bond is treated with an ester compound, an ether compound and titanium tetrachloride.

(6) A method in which a solid product obtained by reducing a titanium compound with an organomagnesium compound in the presence of an organosilicon compound or an organosilicon compound and an ester compound is treated by adding, in order, a mixture of an ether compound and titanium tetrachloride, followed by an organic acid halide compound, and the treated solid is subsequently treated with a mixture of an ether compound and titanium tetrachloride or a mixture of an ether compound, titanium tetrachloride and an ester compound.

(7) A method in which the product of the contact catalysis of a metal oxide, dihydrocarvyl magnesium and a halogen-containing alcohol is contacted with an electron donor and a titanium compound, either following treatment with a halogenating agent or without such treatment.

(8) A method in which a magnesium compound such as the magnesium salt of an organic acid or an alkoxymagnesium is contacted with an electron donor and a titanium compound, either following treatment with a halogenating agent or without such treatment.

(9) Treating the compound obtained in any of methods (1) to (8) above with a halogen, a halogen compound or an aromatic hydrocarbon.

Of the above methods for preparing catalyst component A, methods (1) to (6) are preferred. These methods of preparation are generally all carried out in an inert gas atmosphere, such as nitrogen or argon.

In the preparation of catalyst component A, the titanium compound, organosilicon compound and ester compound are preferably used after dissolution or dilution in a suitable solvent. Illustrative examples of such solvents include aliphatic hydrocarbons such as hexane, heptane, octane and decane; aromatic hydrocarbons such as toluene and xylene; alicyclic hydrocarbons such as cyclohexane, methylcyclohexane and decalin; and ether compounds such as diethyl ether, dibutyl ether, diisoamyl ether and tetrahydrofuran.

In the preparation of catalyst component A, the temperature of the reducing reaction which uses an organomagnesium compound is generally from −50 to +70° C. From the standpoint of catalyst activity and cost, the temperature is preferably from −30 to +50° C., and more preferably from −25 to +35° C. The dropwise addition time for the organomagnesium compound, while not subject to any particular limitation, is generally from about 30 minutes to about 12 hours. Following completion of the reducing reaction, subsequent reactions may be carried out at a temperature of from 20 to 120° C.

In the preparation of catalyst component A, the reducing reaction may be carried out in the presence of a porous material such as an inorganic oxide or an organic polymer so as to allow the solid product to impregnate into the porous material. Such porous materials preferably have a pore volume at a pore radius of from 20 to 200 nm of at least 0.3 ml/g and an average particle size of from 5 to 300 µm. Examples of porous inorganic oxides include $SiO_2$, $Al_2O_3$, $MgO$, $TiO_2$, $ZrO_2$ and composite oxides thereof. Examples of porous polymers include polystyrene-based porous polymers such as polystyrene and styrene-divinylbenzene copolymers; polyacrylate-based porous polymers such as polyethyl acrylate, methyl acrylate-divinyl benzene copolymers, polymethyl methacrylate and methyl methacrylate-divinylbenzene copolymers; and polyolefin-based porous polymers such as polyethylene, ethylene-methyl acrylate copolymers and polypropylene. Of these porous substances, $SiO_2$, $Al_2O_3$ and styrene-divinylbenzene copolymers are preferred.

The organoaluminum compound component used in the preparation of a Ziegler solid catalyst has at least one aluminum-carbon bond on the molecule and may typically have one of the following general formulas.

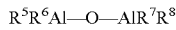

In the above formulas, $R^4$ to $R^8$ are each hydrocarbon groups having from 1 to 8 carbons, and Y is a halogen atom, hydrogen or an alkoxy group. $R^4$ to $R^8$ may each be the same or different. Also, the letter m is a number such that $2 \leq m \leq 3$.

Illustrative examples of the organoaluminum compound component include trialkylaluminums such as triethylaluminum and triisobutylaluminum; dialkylaluminum hydrides such as diethylaluminum hydride and diisobutylaluminum hydride; dialkylaluminum halides such as diethylaluminum chloride and diisobutylaluminum chloride; mixtures of a trialkylaluminum with a dialklylaluminum halide, such as a mixture of triethylaluminum with diethylaluminum chloride; and alkylalumoxanes such as tetraethyldialumoxane and tetrabutyldialumoxane. Of these organoaluminum compounds, the use of a trialkylaluminum, a mixture of a trialkylaluminum with a dialkylaluminum halide, or an alkylalumoxane is preferred. The use of triethylaluminum, triisobutylaluminum, a mixture of triethylaluminum and diethylaluminum chloride, or tetraethyldialumoxane is more preferred, Examples of the electron donor component used in the preparation of a Ziegler solid catalyst include the following commonly used electron donors: oxygen-containing electron donors such as alcohols, phenols, ketones, aldehydes, carboxylic acids, the esters of organic or inorganic acids, ethers, acid amides and acid anhydrides; and nitrogen-containing electron donors such as ammonia, amines, nitriles and isocyanates. Of these electron donor components, inorganic acid esters and ethers are preferred.

Preferred inorganic acid esters include silicon compounds of the general formula $R^9{}_nSi(OR^{10})_{4-n}$ (where $R^9$ is a hydrocarbon group of 1 to 20 carbons or a hydrogen atom, $R^{10}$ is a hydrocarbon group of 1 to 20 carbons, and the letter n is such that $0 \leq n \leq 4$). Illustrative examples include tetrabutoxysilane, butyltrimethoxysilane, tert-butyl-n-propyldimethoxysilane, dicyclopentyldimethoxysilane and cyclohexylethyldimethoxysilane.

Preferred ethers include dialkyl ethers, and diether compounds of the general formula

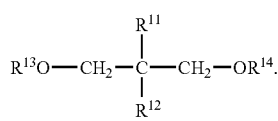 [C1]

In the above formula, $R^{11}$ to $R^{14}$ are each independently a linear or branched alkyl, alicyclic hydrocarbon, aryl or aralkyl group of 1 to 20 carbons, although $R^{11}$ or $R^{12}$ may be a hydrogen atom. Illustrative examples include dibutyl ether, diamyl ether, 2,2-diisobutyl-1,3-dimethoxypropane and 2,2-dicyclopentyl-1,3-dimethoxypropane.

Of these electron donor components, an organosilicon compound of the general formula $R^{15}R^{16}Si(OR^{17})_2$ is especially preferred. Here, $R^{15}$ is a hydrocarbon group of 3 to 20 carbons in which the carbon atoms neighboring the silicon are secondary or tertiary. Illustrative examples include branched chain alkyl groups such as isopropyl, sec-butyl, tert-butyl and tert-amyl; cycloalkyl groups such as cyclopentyl and cyclohexyl; cycloalkenyl groups such as cyclopentenyl; and aryl groups such as phenyl and tolyl. In this formula, $R^{16}$ is a hydrocarbon group of 1 to 20 carbons, illustrative examples of which include straight chain alkyl groups such as methyl, ethyl, propyl, butyl and pentyl; branched alkyl groups such as isopropyl, sec-butyl, tert-butyl and tert-amyl; cycloalkyl groups such as cyclopentyl and cyclohexyl; cycloalkenyl groups such as cyclopentenyl; and aryl groups such as phenyl and tolyl. Also, in the above formula, $R^{17}$ is a hydrocarbon group of 1 to 20 carbons, and is preferably a hydrocarbon group of 1 to 5 carbons. Illustrative examples of organosilicon compounds that may be used as such electron donor components include tert-butyl-n-propyldimethoxysilane, dicyclopentyldimethoxysilane and cyclohexylethyldimethoxysilane.

In the preparation of a Ziegler solid catalyst, the organoaluminum compound component is used in an amount, per mole of titanium atoms in catalyst component A, of generally from 1 to 1,000 moles, and preferably from 5 to 800 moles. The electron donor component is used in an amount, per mole of titanium atoms in catalyst component A, of generally from 0.1 to 2,000 moles, preferably from 0.3 to 1,000 moles, and more preferably from 0.5 to 800 moles.

Catalyst component A, the organoaluminum compound component and the electron donor component may be brought into mutual contact before being fed to the multistage polymerization reactor, or may be separately fed to the multistage polymerization reactor, then contacted within the reactor. Alternatively, any two of these components may first be contacted with each other, and the remaining component subsequently brought into contact, or the respective components may be brought into mutual contact in a plurality of divided portions.

Examples of metallocene compounds that may be used to prepare the metallocene-type solid catalyst include transition metal compounds of the following general formula.

$L_xM$

In the formula, M is a transition metal, x is a number which satisfies the atomic valence of the transition metal M, and L is a ligand attached to the transition metal. At least one occurrence of L is a ligand having a cyclopentadienyl skeleton.

The transition metal M is preferably an atom from groups 3 to 6 of the Periodic Table of the Elements (IUPAC, 1989), and more preferably titanium, zirconium or hafnium.

Ligands L having a cyclopentadienyl skeleton are exemplified by (substituted) cyclopentadienyl groups, (substituted) indenyl groups and (substituted) fluorenyl groups. Illustrative examples include cyclopentadienyl, methylcyclopentadienyl, tert-butylcyclopentadienyl, dimethylcyclopentadienyl, tert-butylmethylcyclopentadienyl, methyl-isopropylcyclopentadienyl, trimethylcyclopentadienyl, tetramethylcyclopentadienyl, pentamethylcyclopentadienyl, indenyl, 4,5,6,7-tetrahydroindenyl, 2-methylindenyl, 3-methylindenyl, 4-methylindenyl, 5-methylindenyl, 6-methylindenyl, 7-methylindenyl, 2-tert-butylindenyl, 3-tert-butylindenyl, 4-tert-butylindenyl, 5-tert-butylindenyl, 6-tert-butylindenyl, 7-tert-butylindenyl, 2,3-dimethyindeyl, 4,7-dimethylindenyl, 2,4,7-trimethylindenyl, 2-methyl-4-isopropylindenyl, 4,5-benzindenyl, 2-methyl-4,5-benzindenyl, 4-phenylindenyl, 2-methyl-5-phenylindenyl, 2-methyl-4-phenylindenyl, 2-methyl-4-naphthylindenyl, fluorenyl, 2,7-dimethylfluorenyl, 2,7-di-tert-butylfluorenyl and substituted versions of the above. In cases where there are a plurality of ligands having a cyclopentadienyl skeleton, these ligands may be mutually like or unlike.

Ligands L other than those having a cyclopentadienyl skeleton are exemplified by heteroatom-bearing groups, halogen atoms and hydrocarbon groups (excluding groups having a cyclopentadiene-type anion skeleton).

Examples of the heteroatom in the heteroatom-bearing group include oxygen, sulfur, nitrogen and phosphorus atoms. Such groups are exemplified by alkoxy groups, aryloxy groups, thioalkoxy groups, thioaryloxy groups, alkylamino groups, arylamino groups, alkylphosphino groups, arylphosphino groups, and aromatic or aliphatic heterocyclic groups having on the ring at least one atom selected from among oxygen, sulfur, nitrogen and phosphorus atoms. Illustrative examples of the halogen atoms include fluorine, chlorine, bromine and iodine atoms. The hydrocarbon groups are exemplified by alkyl, aralkyl, aryl and alkenyl groups.

Two or more ligands L may be directly linked to each other or may be linked through a residue containing at least one type of atom selected from among carbon, silicon, nitrogen, oxygen, sulfur and phosphorus atoms. Illustrative examples of such residues include alkylene groups such as methylene, ethylene and propylene; substituted alkylene groups such as dimethylmethylene(isopropylidene) and diphenylmethylene; silylene groups; substituted silylene groups such as dimethylsilylene, diethylsilylene, diphenylsilylene, tetramethyldisilylene and dimethoxysilylene; and heteroatoms such as nitrogen, oxygen, sulfur and phosphorus. Of these, methylene, ethylene, dimethylmethylene(isopropylidene), diphenylmethylene, dimethylsilylene, diethylsilylene, diphenylsilylene and dimethoxysilylene are especially preferred.

Illustrative examples of metallocene compounds include bis(cyclopentadienyl)zirconium dichloride, bis(methylcyclopentadienyl)zirconium dichloride, bis(indenyl)zirconium dichloride, bis(4,5,6,7-tetrahydroindenyl)zirconium dichloride, ethylenebis(indenyl)zirconium dichloride, dimethylsilylenebis(trimethylcyclopentadienyl)zirconium dichloride, dimethylsilylenebis(indenyl)zirconium dichloride and dimethylsilyl(tetramethylcyclopentadienyl)(3,5-di-tert-butyl-2-phenoxy)titanium dichloride. Additional examples include compounds in which the dichloride has been substituted with dimethoxide or diphenoxide groups.

Cocatalyst components that may be used in the preparation of metallocene-type solid catalysts include organoaluminumoxy compounds, organoaluminum compounds and boron compounds.

Illustrative examples of the organoaluminumoxy compounds include tetramethyldialuminoxane, tetraethyldialuminoxane, tetrabutyldialuminoxane, tetrahexyldialuminoxane, methylaluminoxane, ethylaluminoxane, butylaluminoxane and hexylaluminoxane.

Illustrative examples of organoaluminum compounds include trimethylaluminum, triethylaluminum, tri-n-butylaluminum, triisobutylaluminum and tri-n-hexylaluminum.

Illustrative examples of boron compounds include tris(pentafluorophenyl)borane, triphenylcarbenium tetrakis(pentafluorophenyl)borate, tri(n-butyl)ammonium tetrakis(pentafluorophenyl)borate and N,N-dimethylanilinium tetrakis(pentafluorophenyl)borate.

The granular carrier that may be used in the preparation of metallocene solid catalysts is preferably a porous substance, illustrative examples of which include inorganic oxides such as $SiO_2$, $Al_2O_3$, MgO, $ZrO_2$, $TiO_2$, $B_2O_3$, CaO, ZnO, BaO and $ThO_2$; clays or clayey minerals such as smectite, montmorillonite, hectorite, laponite and saponite; and organic polymers such as polyethylene, polypropylene and styrene-divinyl benzene copolymer.

Metallocene-type solid catalysts that may be used include those mentioned in, for example, Japanese Patent Application Laid-open No. S 60-35006, Japanese Patent Application Laid-open No. S 60-35007, Japanese Patent Application Laid-open No. S 60-35008, Japanese Patent Application Laid-open No. S 61-108610, Japanese Patent Application Laid-open No. S 61-276805, Japanese Patent Application Laid-open No. S 61-296008, Japanese Patent Application Laid-open No. S 63-89505, Japanese Patent Application Laid-open No. H 3-234709, Japanese Translation of PCT Application No. H 5-502906, Japanese Patent Application Laid-open No. H 6-336502 and Japanese Patent Application Laid-open No. H 7-224106.

When a metallocene-type solid catalyst is used in olefin polymerization, a cocatalyst component such as an organoaluminum compound or a boron compound may be used together if necessary. In such cases, the metallocene-type solid catalyst and the cocatalyst component may be brought into mutual contact prior to being fed into the polymerization reactor, or may be separately fed into the polymerization reactor and contacted within the reactor. Alternatively, the respective components may be brought into mutual contact in a plurality of divided portions.

The mass mean particle diameter of the above solid catalyst for olefin polymerization is generally from 5 to 150 μm. In a gas phase polymerization reactor in particular, to suppress the scattering of particles to the reactor exterior, the catalyst has a mass mean particle diameter of preferably at least 10 μm, and more preferably at least 15 μm. The polymerization catalyst in the present embodiment may include additives such as a fluidization aid and an antistatic additive. Together with the polymerization catalyst of the present embodiment, concomitant use may also be made of a chain transfer agent such as hydrogen for the purpose of regulating the molecular weight of the polymer.

The olefin polymerization catalyst may be a so-called prepolymerization catalyst which first induces polymerization in a small amount of olefin. Examples of olefins that may be used in prepolymerization include the olefins that may be used in the above-described polymerization. In this case, a single type of olefin may be used alone, or two or more different olefins may be used together.

Methods for producing the prepolymerization catalyst include, but are not limited to, slurry polymerization and gas phase polymerization. Of these, slurry polymerization is preferred. The use of the latter in production is sometimes economically advantageous. Production may be carried out using a batch system, a semibatch-type system or a continuous system.

The mass mean particle diameter of the prepolymerization catalyst is from 5 to 1,000 μm. In a gas phase polymerization reactor in particular, to minimize scatter to the exterior of the reactor, the mass mean particle diameter is preferably at least 10 μm, and more preferably at least 15 μm. Moreover, it is desirable for the amount of prepolymerization catalyst having a particle diameter of less than 20 μm, and especially less than 10 μm, to be low.

The polymerization catalyst may be introduced into the reactor as a suspension in a hydrocarbon solvent or the like. Introduction by entrainment with monomer gas or an inert gas such as nitrogen is also possible.

Next, the process of producing a polyolefin using such a system is described.

First, a polyolefin powder containing a catalyst component having a polymerization activity is formed in the olefin prepolymerization reactor 9 using an olefin polymerization catalyst prepared by a known method.

Separately from the above, an olefin monomer gas is fed via line L30 into the olefin polymerization reactor 10A from the nozzle 40, the pressure is raised to the polymerization pressure, and the interior of the cylinder 12 is heated. The polymerization pressure, which may be any pressure within a range at which the olefin is capable of being present in the reactor as a gas phase, is generally from standard pressure to 10 MPaG, preferably from 0.2 to 8 MPaG, and more preferably from 0.5 to 5 MPaG. At a polymerization pressure below standard pressure, the productivity may decrease. On the other hand, at a reaction pressure above 10 MPaG, equipment costs for the reactor may become high. The polymerization temperature varies according to the type of monomer, the molecular weight of the product and other factors, although a temperature below the melting point of the olefin polymer, and preferably at least 10° C. lower than the melting point, is desirable. Specifically, the temperature is preferably from 0 to 120° C., and more preferably from 20 to 100° C., still more preferably from 40 to 100° C. It is preferable to carry out polymerization in an environment which is substantially free of moisture. The presence of moisture may lower the polymerization activity of the polymerization catalyst. Also, the presence of excess oxygen, carbon monoxide or carbon dioxide within the polymerization reaction system may lower the polymerization activity.

Next, polyolefin particles having a particle diameter of from about 0.5 mm to about 5.0 mm which have been obtained separately by a known method are fed to the cylinder 12 through a feed line (not shown) connected to line L5. The polyolefin particles are most often particles which do not contain a catalyst component having a polymerization activity, although the presence within the particles of a catalyst component having a polymerization activity is acceptable.

When polyolefin powder is fed into the cylinder 12 while feeding an olefin monomer gas from the nozzle 40, as shown in FIG. 5, a spouted bed of polyolefin powder is formed within the polymerization stage 25. That is, under the action of the gas from the gas inlet orifice, the powder concentration thins near the center axis of the cylinder 12 in the polymerization stage 25 and a spout is formed in which powder flows upward together with the gas. At the same time, an annular structure of powder falling in the manner of a moving bed under the influence of gravity is formed at the periphery thereof giving rise to the circulatory movement of powder within the polymerization stage 25.

Once a spouted bed has been formed within each polymerization stage 25, the polyolefin powder containing a catalyst component having a polymerization activity that was formed in the prepolymerization reactor 5 is fed from line L5 into the cylinder 12 at a constant rate per unit time, thereby commencing steady-state operation of the olefin polymerization reactor 10A. As the particles of polyolefin powder containing a catalyst component having a polymerization activity grow within each polymerization stage 25, the polyolefin powder successively falls through the powder transfer device 1 and into the polymerization stage 25 below, and is eventually discharged from the bottom downcomer 36.

Meanwhile, part of the olefin monomer-containing gas forms a spout and sweeps past the powder bed, while the remainder of the gas diffuses into the portion of the powder bed having an annular structure. In this way, the olefin-containing gas and the polyolefin powder undergo solid-gas contact and the action of the catalyst within the polyolefin powder causes the olefin polymerization reaction to proceed, resulting in growth of the particles of polyolefin powder.

For a stable spouted bed to form in each polymerization stage 25, it is preferable that the following operating condition be satisfied; i.e., that the gas superficial velocity $U_0$ be equal to or greater than the minimum gas superficial velocity Ums at which a spouted bed is capable of forming. In addition to the physical properties of the powder and gases being handled, the minimum gas superficial velocity Ums is also influenced by the shape of the polymerization reactor. Various formulas have been proposed for calculating the minimum gas superficial velocity Ums. One example is formula (1) below.

[E1]

$$Ums = \frac{d_p}{d_B}\left(\frac{d_A}{d_B}\right)^{1/3} \sqrt{\frac{2gL_S(\rho_S - \rho_G)}{\rho_G}} \times \left(\frac{\rho_G}{\rho_{AIR}}\right)^{0.2} \quad (1)$$

In this formula, $d_P$ is the particle diameter, $\rho_S$ is the particle density, $\rho_G$ is the gas density under the pressure and temperature conditions of the reaction zone, $\rho_{AIR}$ is the density of air under room temperature conditions, and $L_s$ is the height of the spouted bed.

The spouted bed height $L_S$ within the polymerization stage 25 is equal to or less than the maximum spouted bed height $Ls_{MAX}$ to which a spouted bed is capable of forming, and is not subject to any particular limitation provided it is equal to or less than the maximum spouted bed height $Ls_{MAX}$. Various formulas for calculating the maximum spouted bed height $Ls_{MAX}$ have been proposed, one of which is formula (2) below. From the standpoint of volume efficiency and enabling the formation of a more stable spouted bed, it is preferable for the lower limit in the spouted bed height $L_s$ to be higher than the tubular baffle 30.

[E2]

$$\frac{Ls_{MAX}}{d_B} = \frac{d_B}{d_A}\left\{0.218 + \frac{0.005(\rho_S - \rho_G)gd_A}{\rho_G u_t u_{mf}}\right\} \quad (2)$$

In this formula, $u_t$ is the terminal velocity of the particles, and $u_{mf}$ is the minimum fluidization velocity.

As shown in FIG. 4, liquid monomer from the nozzle 50 may be fed to an intermediate stage of the cylinder 12. This enables the olefin monomer consumed by the polymerization reaction to be replenished. In addition, when the liquid olefin monomer vaporizes within the cylinder 12, heat removal from the polyolefin powder is also possible owing to the latent heat of vaporization. In the plurality of polymerization stages 25 within the cylinder 12, on account of the heat of reaction, the temperature of a polymerization stage 25 tends to be higher the further up the polymerization stage 25 is located within the cylinder 12, resulting in a temperature difference with lower polymerization stages 25. Hence, to equalize the temperature, liquid olefin monomer is fed from a nozzle 50 provided at an intermediate stage of the cylinder 12, thereby enabling this temperature difference to be held to a minimum.

With the olefin polymerization reactor 10A according to the present embodiment, multiple spouted beds are formed within the cylinder 12, enabling the powder residence time distribution to be narrowed. Accordingly, in the continuous production of olefin polymer, it is possible to produce olefin polymer having an excellent structural uniformity. Moreover, when the production conditions are to be changed, because polyolefin powder polymerized prior to the change in conditions can be easily discharged from the cylinder 12, the amount of off-specification product that arises as a result can be cut to a sufficient degree. Also, by providing deflectors 20 to suppress the scattering of spouted powder, the freeboard zones can be shortened, enabling a high volume efficiency to be achieved. Furthermore, because the above-described powder transfer device 1 is provided, the transfer rate of polyolefin powder from a higher stage to a lower stage can be easily adjusted. Also, the absence of moving parts helps to keep problems such as the sticking of polyolefin from occurring.

The present invention is not limited to the above embodiment. For example, in the above embodiment, an olefin polymerization reactor in which five spouted beds are formed in the vertical direction has been described. However, the number of spouted beds is not limited to five, and may even be one. From the standpoint of achieving a sufficient plug flow effect, the number of spouted beds is preferably at least three, and more preferably at least six. Moreover, the plurality of spouted beds need not necessarily be formed in the vertical direction. For example, a plurality of reactors within each of which a single spouted bed is formed at the interior may be arranged in a horizontal direction and coupled in series. Also, at the time of reactor design and operation control, it is preferable to design the volume of each reactor stage and control the polyolefin particle hold-up or residence time in such a way as to narrow the residence time distribution of the polyolefin particles and to make the amount of polyolefin produced at each stage of the polymerization process (including the olefin prepolymerization reactor 5) more uniform.

Moreover, in the above embodiment, a case was described in which a liquid feed nozzle 50 is disposed near the gas inlet orifice of the second tubular baffle 30 from the top. However, the positions and number of liquid feed nozzles 50 may be suitably set according to the type of polyolefin particles to be produced. For example, if the temperatures of the respective reaction zones 25 can be equalized by some other means, it may not be necessary to provide liquid feed nozzles 50. Alternatively, a liquid feed nozzle 50 may be provided near the gas inlet orifice at each of the tubular baffles 30.

In addition, each of the downcomers 2, 36 mentioned in the above embodiments have a top end that protrudes above a tubular baffle 30, and the powder hold-up in each polymerization stage can be easily regulated by means of the height of the top end. In cases where the polyolefin powder is impeded from flowing between the outside surfaces of these downcomers 2, 36 and the inside surface of the cylinder 12 or the inside surfaces of the tubular baffles 30, the downcomers 2, 36 may be constructed so as not to protrude above the inside surfaces of the respective tubular baffles 30. Even in such a case, because the amount of powder transferred from an upper polymerization stage 25 to a lower polymerization stage 25 can be adjusted by the powder transfer device 1, control of the powder hold-up is easy.

In the above-described embodiments, a powder transfer device 1 is provided in each polymerization stage. Alternatively, it is of course possible to provide a powder transfer device 1 only in desired areas.

Figure 6:
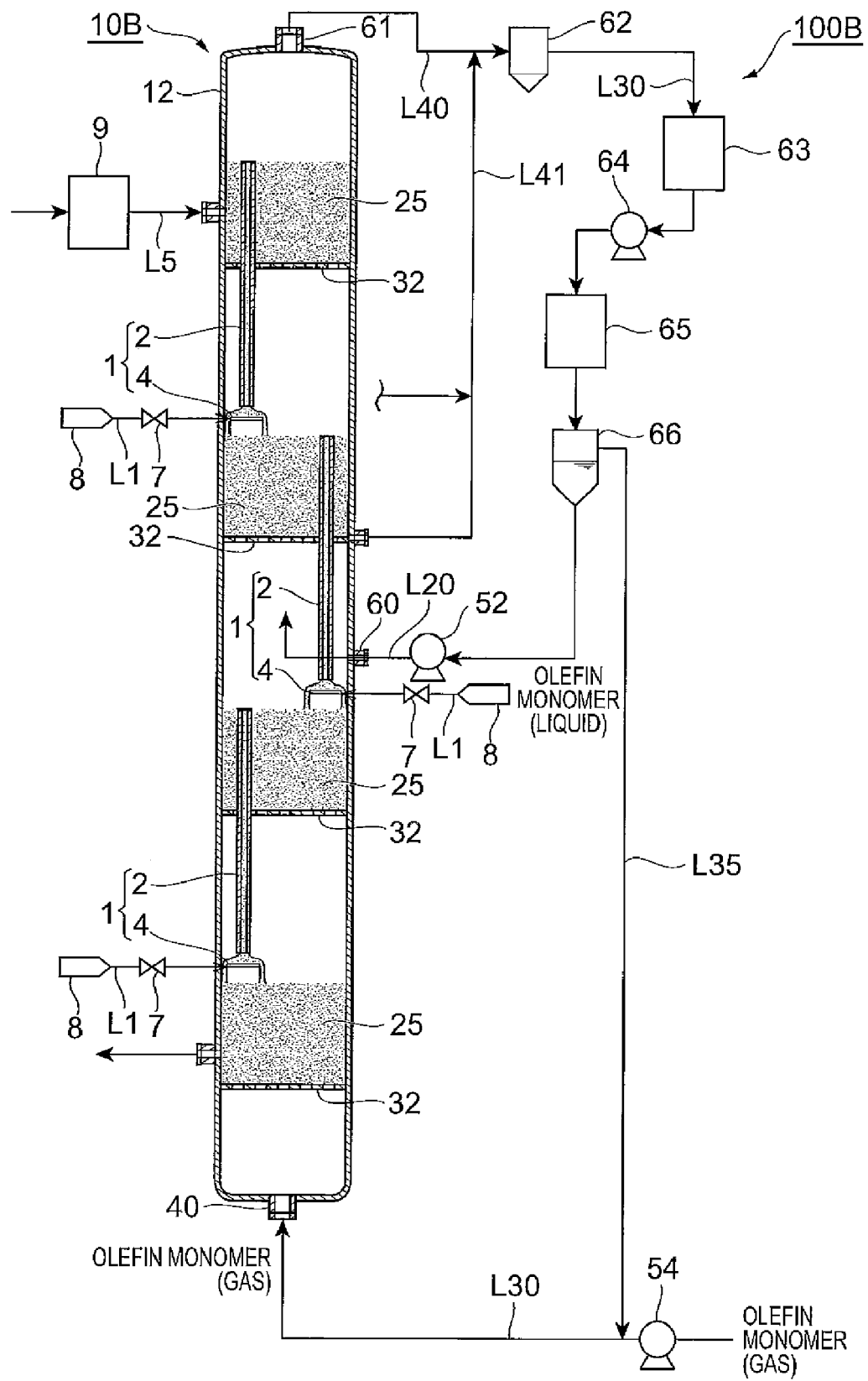
FIG. 6 is a schematic structural view showing another embodiment of a polyolefin production system which includes powder transfer devices of the type shown in FIG. 1.

Also, in the above embodiments, a spouted bed was formed in each polymerization stage 25. However, as shown in FIG. 6, it is also acceptable to form a fluidized bed in each polymerization stage 25. In such a case, aside from using gas dispersion plates 32 instead of tubular baffles 30, the polyolefin production system has substantially the same arrangement as the above-described polyolefin production system.

EXAMPLES

Example 1

The flow rate of a powder transferred by a powder transfer device 1 of the type shown in FIG. 1 was measured at varying superficial velocities for a gas supplied from a gas dispersion plate 6 in an open atmosphere.

Here, the inside diameter Dd at the bottom end of the downcomer 2 was set to 20 mm, the diameter of the gas dispersion plate 6 was set to 55 mm, and the interval L between the gas dispersion plate 6 and the downcomer 2 was set to 12 mm. A metal screen having a mesh size of 60 was used as the gas dispersion plate 6. Air was used as the gas.

The powder used was polypropylene powder having an average particle size of 900 μm. The minimum fluidization velocity was about 20 cm/s.

The gas superficial velocity was set to 8.5, 17.0, 21.2 or 30.8 cm/s by varying the air flow rate. The powder transfer rate was measured three times at each velocity, and the average of the three measurements was taken.

Example 2

Aside from setting the interval L between the gas dispersion plate 6 and the downcomer 2 to 10 mm and setting the gas superficial velocity to 20.2, 28.7 or 35.0 cm/s, the same procedure was carried out as in Example 1.

Example 3

Aside from setting the interval L between the gas dispersion plate 6 and the downcomer 2 to 8 mm and setting the gas superficial velocity to 35.0 cm/s, the same procedure was carried out as in Example 1.

Figure 7:
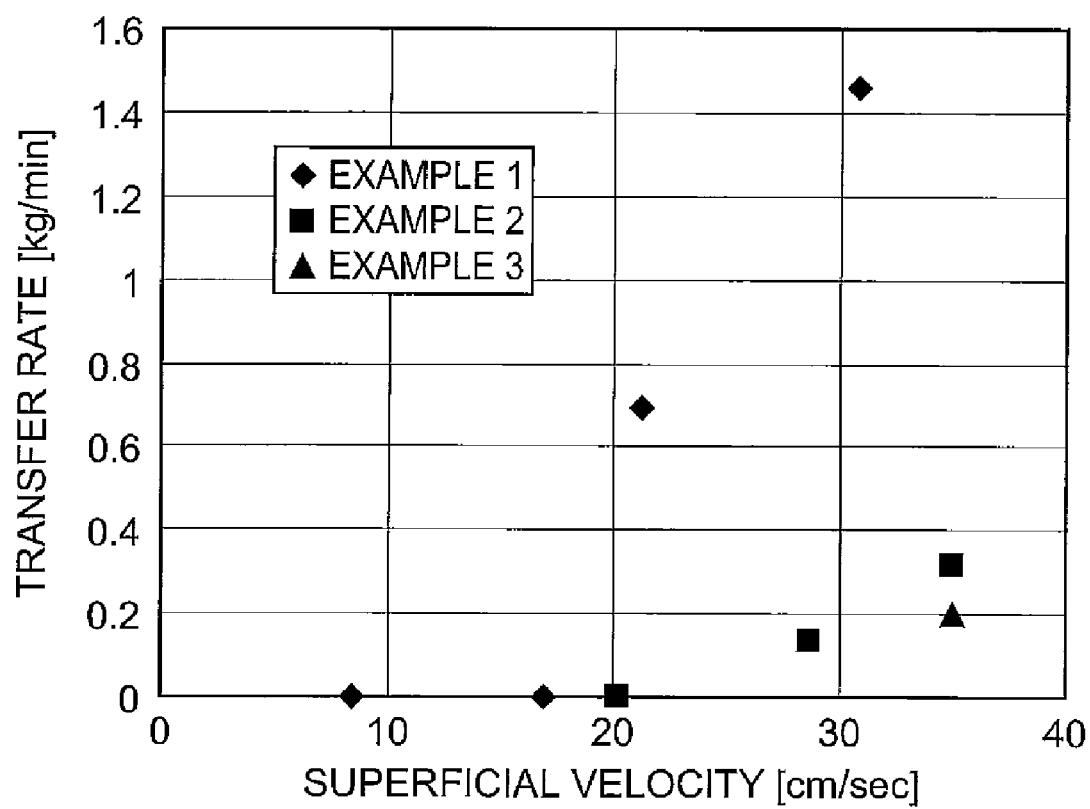
FIG. 7 is a graph showing the results obtained in the examples of the invention and the comparative examples described herein.

The results are shown in Table 1 and FIG. 7.

TABLE 1

|  | Interval L (mm) | Air flow rate (L/min) | Superficial velocity (cm/s) | Powder transfer rate 1 (kg/min) | Powder transfer rate 2 (kg/min) | Powder transfer rate 3 (kg/min) | Average powder transfer rate (kg/min) |
|---|---|---|---|---|---|---|---|
| Example 1-1 | 12 | 8 | 8.5 | 0 | 0 | 0 | 0 |
| Example 1-2 | 12 | 16 | 17.0 | 0 | 0 | 0 | 0 |
| Example 1-3 | 12 | 20 | 21.2 | 0.696 | 0.636 | 0.690 | 0.674 |
| Example 1-4 | 12 | 29 | 30.8 | 1.458 | 1.416 | 1.416 | 1.430 |
| Example 2-1 | 10 | 19 | 20.2 | 0 | 0 | 0 | 0 |
| Example 2-2 | 10 | 27 | 28.7 | 0.132 | 0.126 | 0.126 | 0.128 |
| Example 2-3 | 10 | 33 | 35.0 | 0.318 | 0.336 | 0.348 | 0.334 |
| Example 3-1 | 8 | 33 | 35.0 | 0.201 | 0.186 | 0.171 | 0.186 |

As is apparent from Table 1 and FIG. 7, it was confirmed that at below the fluidization onset velocity, the powder transfer rate can be set to zero, and that at the fluidization onset velocity and above, the transfer rate can be controlled by the gas velocity.

What is claimed is:

1. A powder transfer device comprising:
    a downcomer which extends downward, and
    a gas slider situated below the downcomer,
    wherein the gas slider has, on a side thereof facing an opening at a bottom end of the downcomer, a gas dispersion plate in which a plurality of gas outlets are formed,
    wherein the gas dispersion plate comprises a facing portion that directly faces the opening at the bottom end of the downcomer, and a peripheral portion that surrounds a perimeter of the facing portion at a width W, and
    wherein when θr represents the angle of repose for the powder and L represents the distance between the bottom end of the downcomer and the gas dispersion plate, the width W of the peripheral portion satisfies the condition $W \geq L \cdot \cot(\theta r)$ at all points on the perimeter of the facing portion.

2. An olefin polymerization reactor comprising:
a plurality of vertically arrayed polymerization stages; and
a powder transfer device comprising:
a downcomer which extends downward, and
a gas slider situated below the downcomer;
wherein the gas slider has, on a side thereof facing an opening at a bottom end of the downcomer, a gas dispersion plate in which a plurality of gas outlets are formed; wherein said gas dispersion plate has an edge that allows powder to drop down from said as dispersion plate edge; and
said powder transfer device transfers a polyolefin powder that is present at an upper polymerization stage to a lower polymerization stage.

3. A polyolefin production process comprising the step of, in an olefin polymerization reactor having a plurality of vertically arrayed polymerization stages, transferring a polyolefin powder that is present at an upper polymerization stage to a lower polymerization stage with a powder transfer device, wherein said powder transfer device comprises:
a downcomer which extends downward, and
a gas slider situated below the downcomer;
wherein the gas slider has, on a side thereof facing an opening at a bottom end of the downcomer, a gas dispersion plate in which a plurality of gas outlets are formed; wherein said gas dispersion plate has an edge that allows powder to drop down from said gas dispersion plate edge.

4. An olefin polymerization reactor comprising:
a plurality of vertically arrayed polymerization stages; and
the powder transfer device of claim 1, which transfers a polyolefin powder that is present at an upper polymerization stage to a lower polymerization stage.

5. A polyolefin production process comprising the step of, in an olefin polymerization reactor having a plurality of vertically arrayed polymerization stages, transferring a polyolefin powder that is present at an upper polymerization stage to a lower polymerization stage with the powder transfer device of claim 1.

* * * * *